(12) United States Patent
Stienstra et al.

(10) Patent No.: US 8,836,672 B2
(45) Date of Patent: Sep. 16, 2014

(54) SYSTEM AND METHOD FOR IMPROVING MACHINE VISION IN THE PRESENCE OF AMBIENT LIGHT

(75) Inventors: Curtis W. Stienstra, Wyoming, MI (US); Albert A. Cornelius, Grand Rapids, MI (US); Todd M. Burghgraef, Grand Rapids, MI (US); Nathan S. Meyer, Holland, MI (US); Steven H. VanderLeest, Grand Rapids, MI (US)

(73) Assignee: DornerWorks, Ltd., Grand Rapids, MI (US)

( * ) Notice: Subject to any disclaimer, the term of this patent is extended or adjusted under 35 U.S.C. 154(b) by 368 days.

(21) Appl. No.: 13/368,381

(22) Filed: Feb. 8, 2012

(65) Prior Publication Data

US 2012/0200535 A1    Aug. 9, 2012

Related U.S. Application Data

(60) Provisional application No. 61/441,029, filed on Feb. 9, 2011.

(51) Int. Cl.
*G06F 3/042* (2006.01)
*H04N 5/225* (2006.01)

(52) U.S. Cl.
CPC ............ *G06F 3/0421* (2013.01); *H04N 5/2256* (2013.01); *H04N 2209/048* (2013.01)
USPC .......................... 345/175; 348/164; 348/218.1

(58) Field of Classification Search
CPC ..... G06F 3/0421; G06F 3/0412; G06F 3/044; G06F 17/30247; G06F 19/18; G06F 19/24; G06F 19/34; G06F 21/32; G06F 21/36; G06F 2203/04101; G06F 3/0304; G06F 3/033; G06F 3/03547; G06F 3/038; G06F 3/0416
USPC ........................................................... 345/175
See application file for complete search history.

(56) References Cited

U.S. PATENT DOCUMENTS

| | | |
|---|---|---|
| 3,867,628 A | 2/1975 | Brown |
| 4,243,879 A | 1/1981 | Carroll et al. |
| 4,329,581 A | 5/1982 | Helfrich, Jr. et al. |
| 4,591,710 A | 5/1986 | Komadina et al. |
| 4,855,590 A | 8/1989 | Bures et al. |
| 4,988,983 A | 1/1991 | Wehrer |
| 5,151,945 A | 9/1992 | Lee et al. |
| 5,874,731 A | 2/1999 | Swanson |
| 6,690,363 B2 | 2/2004 | Newton |
| 7,359,564 B2 | 4/2008 | Keam et al. |

(Continued)

*Primary Examiner* — Lixi C Simpson
(74) *Attorney, Agent, or Firm* — Warner Norcross & Judd LLP

(57) ABSTRACT

A system and method utilizing two image sensors to simultaneously capture images of a FOV (field of view). The image sensors are arranged along the same optical path for viewing the FOV. The FOV is illuminated by an illuminator of a specific frequency band. An image is captured by the first image sensor which has a filter that passes at least a portion of the light of the frequency band of the illuminator. An image is captured by the second image sensor that has a filter to pass a band of frequencies adjacent to, but generally not including the frequency band of the illuminator. The images may be manipulated, for example, to provide enhanced performance and/or compensate for variables in the system. A processor subtracts the images to produce an image that represents light reflected back from the illuminator, excluding ambient light at the frequency of the illuminator.

9 Claims, 5 Drawing Sheets

(56) References Cited

U.S. PATENT DOCUMENTS

| | | |
|---|---|---|
| 7,499,090 B2 | 3/2009 | Olmstead et al. |
| 7,531,788 B2 | 5/2009 | Yamamoto |
| 7,612,802 B2 | 11/2009 | Voronov et al. |
| 7,671,848 B2 | 3/2010 | Harada |
| 7,684,029 B2 | 3/2010 | Tan et al. |
| 8,022,941 B2 * | 9/2011 | Smoot ............................ 345/175 |
| 2004/0070509 A1 * | 4/2004 | Grace et al. .................... 340/575 |
| 2004/0156557 A1 | 8/2004 | Van Der Weij |
| 2007/0153286 A1 * | 7/2007 | Hughes et al. ................. 356/451 |
| 2007/0263099 A1 | 11/2007 | Motta et al. |
| 2008/0029691 A1 * | 2/2008 | Han ................................ 250/224 |
| 2008/0203277 A1 | 8/2008 | Warszauer et al. |
| 2008/0259051 A1 * | 10/2008 | Ota ................................. 345/175 |
| 2010/0013938 A1 | 1/2010 | Fukuda et al. |
| 2011/0241987 A1 * | 10/2011 | Howse ........................... 345/158 |
| 2012/0018637 A1 * | 1/2012 | Mitani ........................ 250/339.02 |
| 2012/0127128 A1 * | 5/2012 | Large et al. .................... 345/175 |

\* cited by examiner

SYSTEM AND METHOD FOR IMPROVING MACHINE VISION IN THE PRESENCE OF AMBIENT LIGHT

BACKGROUND OF THE INVENTION

The present invention relates to systems and methods for addressing ambient light in a captured image. The present invention is well-suited for use in touch/multitouch input systems that utilize light reflection to detect screen touches in the presence of ambient light and in machine vision systems that capture images more difficult to process due to the presence of ambient light.

Many machine vision systems are adversely affected by ambient light. The term ambient light refers to the light that is available in a room or other environment, external to a system. Too much ambient light can cause poor perform in machine vision systems by either masking objects or fooling the system with false positives. Ambient light can come from a variety of sources including room lighting, direct and indirect sunlight. These problems can be particularly acute in the context of machine vision systems that have a source of illumination and rely on reflections from the source of illumination as part of the vision system. In many applications of this type, the intensity of ambient light can be significantly greater than the intensity of the light reflecting from the source of illumination. As a result, ambient light can overwhelm the image sensor and mask reflections from the source of illumination, thereby making it difficult for the vision system to operate properly. The problems can be compounded when the amount of ambient light in an environment changes over time. For these reasons it is important to properly account for and guard against ambient light interference in machine vision systems.

A variety of systems and methods have been developed to address the problem of ambient light in the context of multitouch input systems and machine visions systems. Although many of these systems may provide improved performance, there remains a need for a system and method that addresses these problems with a more appropriate balance between cost, efficiency and effectiveness.

SUMMARY OF THE INVENTION

The present invention provides a system with a pair of synchronized image sensors that simultaneously capture images from a shared field of view (FOV) and processing capabilities that permit adjustment for ambient light based on processing of the two simultaneously captured images. In one embodiment, the system includes a beam splitter that splits light to simultaneously send essentially the same field of view (FOV) to the two image sensors.

In one embodiment, the system includes a source of illumination that transmits light of a certain frequency range onto the object being imaged (e.g. a touchscreen). In this embodiment, the first of the two image sensors is configured to obtain an image from a frequency range that includes light from the source of illumination and the second of the two image sensors is configured to obtain an image from a frequency range that does not include a material amount of light from the image sensor. The frequency range captured by the second image sensor may be adjacent to the frequency range of the source of illumination.

In one embodiment, the system includes a processor that subtracts the two simultaneously captured images to produce a single image that represents essentially only the light from the source of illumination that was reflected back by the object being imaged (e.g. such as a finger on touchscreen). The subtracted image will generally exclude any ambient light present at the frequency of the source of illumination, thereby reducing the signal to noise ratio in the image.

In one embodiment, the beam splitter is a half-silvered mirror, but other beam splitters may be used, such as a pellicle mirror or a cube-beam splitter.

In one embodiment, the present invention may be incorporated into a multitouch screen in which visible light images are projected onto a screen for, among other things, user interface purposes. In such embodiments, the source of illumination may be an LED that emits light in the infrared portion of the spectrum. This may help to avoid interference from visible light, such as the visible light images projected onto the touch screen for user interface purposes. In such applications, the LED may have a half power range of about 842 nm to about 864 nm, the first image sensor may have a filter that passes light in the 845 nm to 855 nm range, and the second image sensor may have a filter that passes light in the 805 nm to 815 nm range.

In one embodiment, the system is configured so that both image sensors share the same field of view, thereby providing substantial correlation between the images obtained by the two sensor images. For example, the beam-splitter and/or the position and orientation of the image sensors may be adjusted to provide correlation between the images. The correlation need not be absolute on a pixel-by-pixel basis, but the correlation should be sufficient to allow subtraction of the two images. In addition or in the alternative, one or both of the images obtained by the two image sensors may be modified to provide substantial correlation between the two. For example, one or both images may be transformed using a transformation matrix (e.g. rotation, clipping, perspective change) so that the two images substantially correlate.

In one embodiment, the system includes two sources of illumination that are used alternately to compensate for blind spots created by a single source of illumination. For example, there may be one or more regions where the reflections from a single source of illumination are so intense that they overwhelm the image sensor and create a region where reflections from the illumination source cannot be detected. In this embodiment, a first pair of simultaneous images may be taken while the first source of illumination is on and a second pair of simultaneous images may be taken while the second source of illumination is on. The two images may be knitted together to provide a single image with no blind spots.

In another aspect, the present invention provides a method for adjusting to ambient light conditions. In one embodiment, the method includes the steps of: (a) illuminating an object with a source of light in a first frequency range, (b) providing a first image sensor with a filter allowing light from at least a portion of the first frequency range to pass, (c) providing a second image sensor with a filter that does not allow light from the first frequency range to pass, (d) splitting the light reflected from the object to project two essentially identical images onto the two image sensors, (e) obtaining two simultaneous images of the object with the two image sensors, and (f) subtracting the two images to obtain an image without ambient light. In one embodiment, the method may further include the step of transforming one or both of the images to provide substantial correlation between the images. For example, this step may include clipping, stretching and/or adjusting perspective in one or both images. These transformations may be achieved by applying an appropriate transformation matrix to the image(s).

The present invention provides a simple and effective system and method that permits machine vision systems to easily and accurately compensate for the affects of ambient light. The use of simultaneous images reduces the risk of problems associated with moving elements in the imaged object or changing ambient light conditions, such as a cloud passing over the sun for a moment and a person walking in front of a source of room lighting.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

I. Overview

Figure 1:
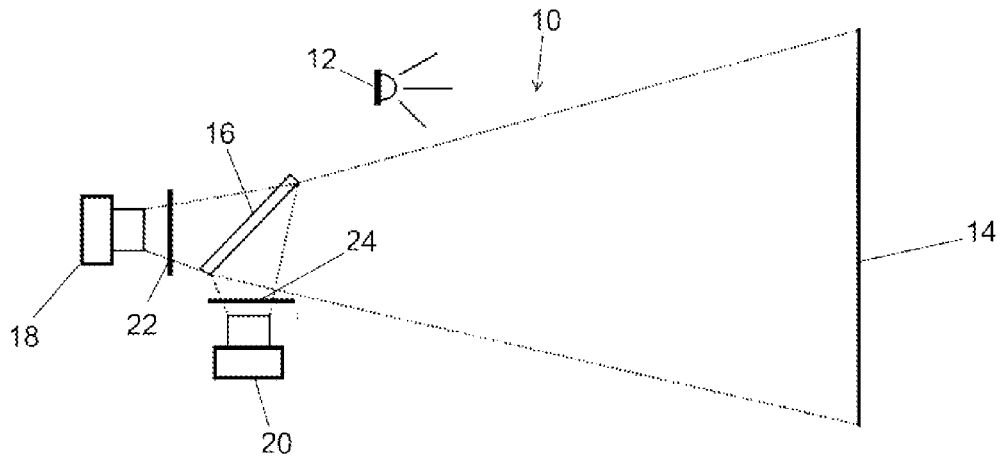
FIG. 1 is a schematic representation of a multitouch input system in accordance with one embodiment of the present invention.

A multitouch input system in accordance with an embodiment of the present invention is shown in FIG. 1. The multitouch system 10 generally includes an illumination source 12, a screen 14, a beam splitter 16, a first image sensor 18, a second image sensor 20, a first filter 22 and a second filter 24. In use, the illumination source 12 emits light into the area to be imaged, which in this case includes the screen 14. The screen 14 is partially transparent to the light emitted by the illumination source 12 in both directions. When one or more objects are present on the screen 14, the object or objects reflect the emitted light back toward the beam splitter 16. The beam splitter 16 splits the light to provide two essentially identical images to the two image sensors 18 and 20. The first image sensor 18 is associated with a first filter 22 that permits light from the illumination source to pass. As such, the image provided by the first image sensor 18 includes ambient light plus any light from the illumination source 12 that is reflected by an object on the screen 14. The second image sensor 18 is associated with a second filter 24 that permits light from a frequency range near, but distinct from the illumination source frequency to pass. Accordingly, the image provided by the second image sensor 20 includes essentially only ambient light. The system 10 includes a processor or digital logic (e.g. an FPGA) that subtracts the two images to provide an image of the screen with ambient light removed.

Although described primarily in the context of a multitouch input system, the present invention is well-suited for use in other applications, such as machine vision applications, where it is desirable to address ambient light in a captured image. For example, the present invention is well-suited and easily adapted for use in machine vision systems that operate using reflections from a source of illumination and that may be susceptible to issues created by ambient light.

II. System

As noted above, a multitouch input system 10 in accordance with an embodiment of the present invention is shown in FIG. 1. This embodiment is configured for incorporation into a projecting-type technology in which the screens of a user interface and/or other images may be projected onto the multitouch screen to guide user input. For example, a visible light projector may be used to project a user interface onto the touch screen using visible light (e.g. light ranging in frequency roughly from 380 nm to 750 nm). The visible light projector may be a front projector or a rear projector. Although these types of multitouch input systems are used in a wide variety of applications, they are perhaps most commonly used with ATMs, kiosks, point-of-sale systems, directory and map displays, factory command and control display panels, cockpit/dashboard displays for land, sea or air vehicles and other similar applications to provide a user interface for an underlying computerized system. In use, the projected visible images may change as the user moves through a series of menus or displays of other types of information. As user touch screen activity occurs, the multitouch input system 10 may report the user touch screen activity to the underlying computerized system, which may drive the interaction by causing appropriate changes to the on screen menus in the user interface. In addition, the underlying computerized system may carry out whatever additional activities might be appropriate in response to the screen activity.

As shown, the system 10 generally includes an illumination source 12, a screen 14, a beam splitter 16, a first image sensor 18, a second image sensor 20, a first filter 22 and a second filter 24. The components of the multitouch input system 10 may be housed in a conventional housing (not shown). The housing may be configured to prevent other sources of light in the frequency range of the illumination source 12 from shining or reflecting on the image sensors 18 and 20.

Figure 2:
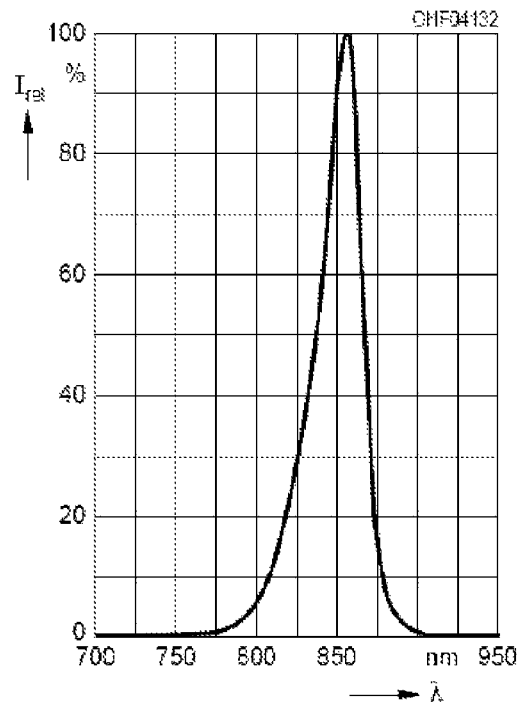
FIG. 2 is a spectral emission plot for a particular illumination source.

The illumination source 12 may be essentially any source of illumination, but there may be benefits to selecting an illumination source of a certain frequency range depending on the application. This particular embodiment of the present invention is intended to be implemented in a multitouch application. As such, certain component choices are beneficial. Ideally the illuminator would emit light in only one frequency. If possible, this would be expensive to produce and therefore would likely not be practical. Accordingly, it is desirable to provide a light source with a relatively narrow emission range. The present invention can be implemented using an illumination source 12 that emits a small range of frequencies, such as the LED of this embodiment. In FIG. 1, the illumination source 12 is chosen to be an LED in the infrared range. Among other things, this prevents the illumination source 12 from interfering with the visible image projected on the screen 14 in the FOV. The LED may, for example, emit light mostly at 850 nm, but the band of light may extend out to ~800 nm and ~875 nm in rapidly diminishing quantities. An emission spectrum for one suitable LED is shown in FIG. 2. One particular LED used consumed a max of 1.8 W of power, but power of the illumination source may vary from application to application.

In some applications, it may be desirable to enable the illumination source only when the image sensor shutter is open. By enabling the illumination source only while the camera shudder is open, higher illumination levels can be reached with lower average power to the illuminator. It should also be noted that the higher the illumination level, the shorter the camera exposure can be. With short exposure times, the effect of ambient light may be reduced.

In some applications, it may be desirable to use multiple illumination sources. For example, multiple illumination sources may be desirable to (a) provide sufficient illumination, (b) more evenly illuminate a region and/or (c) perform touch detection on surfaces that are not flat. Further, if characteristics of the screen and device space restrict placement of illumination sources such that hot spots (reflections of the illumination source from the display screen) are seen in the FOV (touch/projection surface) multiple illumination sources can be utilized to illuminate different portions of the screen during alternating frames. Multiple frames (as many as are needed) are then stitched together to construct a single frame with no hot spots.

Figure 3:
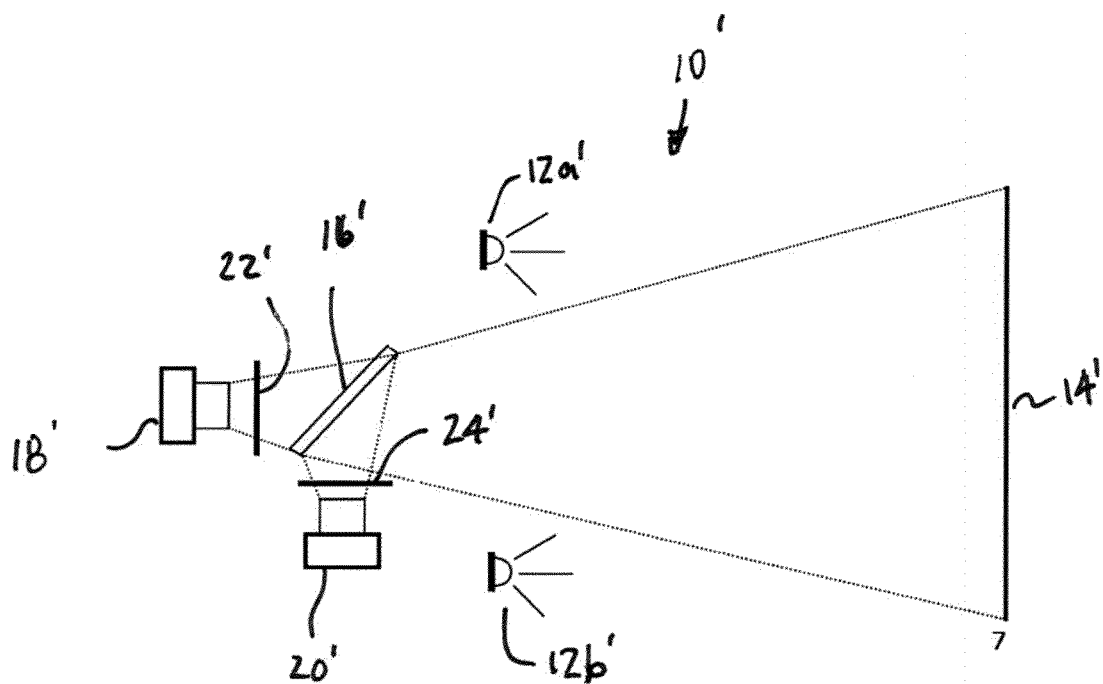
FIG. 3 is a schematic representation of a multitouch system in accordance with an alternative embodiment of the present invention.
Figure 4:
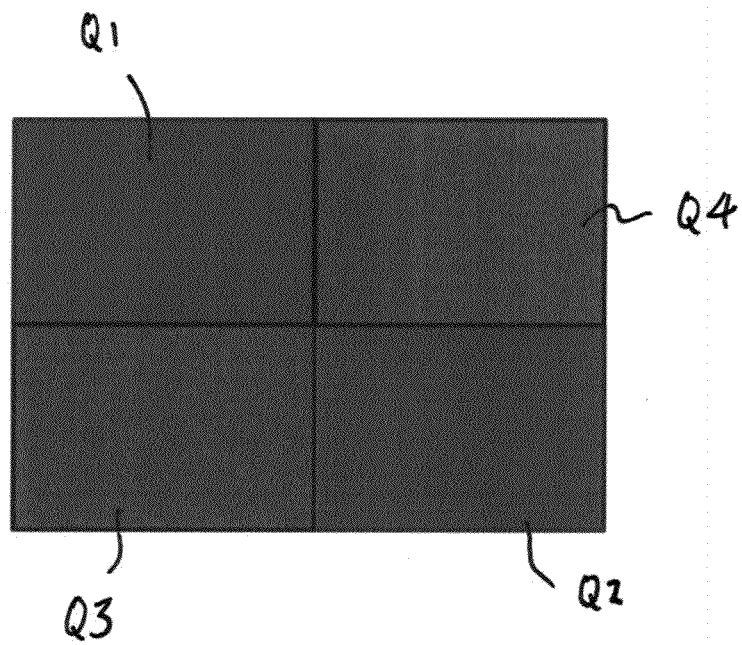
FIG. 4 is a representation of a knitted image in accordance with the alternative embodiment of FIG. 3.

An embodiment of the present invention incorporating multiple illuminators is shown in FIGS. 3-4. In this alternative embodiment, each illumination source 12a' and 12b' may cause glare in a different spot on the screen 14' that will distort the multitouch data in these spots. By using multiple illumination sources at different locations, the system 10' can capture and assemble a series of sequential images (each with different corrupt regions) into a single image without any corrupt regions. For each image sensor, the system may take a first image with one illumination source active to capture an image with a portion of the screen corrupted by glare, and then take a second image with the opposite illumination source active to capture an image with a different portion of the screen corrupted by glare. For each image sensor, these two sequential images may then be stitched together in the processor or with digital logic. For example, the images may be stitched together by copying the good parts of the first captured image into an empty image data set followed by the remaining contents from the second captured image. As another example, the images may be stitched together by overwriting the bad parts of the first captured image with the good parts of the second captured image. The resulting image data sets contain data from the non-distorted sections of each captured image. The two stitched images may then be processed as otherwise described herein. FIG. 4 shows an illustration of two stitched together images. In this illustration, the screen 14' is divided into quadrants Q1-Q4. The first two quadrants Q1 and Q2 are taken from the image that is captured first in time and the second two quadrants Q3 and Q4 are taken from the image that is captured second in time. Together, these four quadrants Q1-Q4 cooperatively provide a full image. Although this alternative embodiment is described in connection with a system and method that involves two illumination sources and the capture of two sequential images for each image sensor, the number of illumination sources and number of sequential images may vary from application to application. For example, additional illumination sources and sequential images may be required when two sequential images are not sufficient to cooperatively provide a full image without any corrupt regions. Further, FIG. 4 illustrates an embodiment in which two images are used to construct a composite image from four quadrants (two quadrants taken from each sequential image). This approach is merely exemplary and the size, shape, arrangement and number of regions that may be stitched together may vary from application to application.

The timing of the two images may be determined by the rate at which the system 10' can capture images with the image sensors. The closer together in time these images can be captured, the less chance there is for ghosted and missed blobs (or objects). In this embodiment, using different illumination sources with a single beam splitter does not cause an issue with the system, as the light emitted by each one is reflected off the screen before travelling back to the beam splitter and then the image sensors.

Returning now to the system of FIG. 1, the screen 14 may be a generally conventional optical touch screen. For example, the screen 14 may include laminated fresnel and lenticular layers. Although the illustrated screen 14 is generally planar, the screen may alternatively be contoured as desired. The screen 14 allows infrared light to pass through the screen 14 in both directions. As a result, during use, the infrared light emit by the illumination source 12 is free to pass through the screen and, if an object is on or in sufficient proximity to the screen, to reflect off of the object back through the screen to the beam splitter 16.

As noted above, the image sensors 18 and 20 are aligned with a beam splitter 16 (e.g. a device that performs a beam splitting function) that will give each image sensor 18 and 20 the same FOV as the other image sensor. In the illustrated embodiment, the beam splitter 16 is a half-silvered mirror that is positioned and oriented to split the IR beam into two roughly equal parts that will be directed at each image sensor. Although the beam splitter of this embodiment is a half-silvered mirror, the beam splitter may alternatively be any device capable of providing adequate splitting of the reflected IR beam. Alternative beam splitters may include a pellicle minor or a pair of prisms (also called a cube beam-splitter). Beam splitters may be custom ordered depending on the application's requirements. In this illustrated embodiment, the beam splitter only needs to split the light into two roughly equal beams, so a generic 'off-the-shelf' part (such as Edmund Optics part NT47-024) is suitable.

The image sensors 18 and 20 may be essentially any device capable of providing an output dependent on light intensity. For example, each image sensors 18 and 20 may be a CCD, CMOS or sCMOS sensor chip. The image sensor resolution may vary from application to application as desired. In the illustrated embodiment, the image sensors 18 and 20 are CMOS sensors from Aptina. The maximum pixel output for this particular sensor is 752×480, but can be configured for less. This particular sensor has improved sensitivity to near-infrared light, which corresponds with the frequency of the illumination source 12. The quality of this sensor is adequate for the illustrated embodiment with a 16-inch diagonal screen. The type of image sensor may vary from application to application depending on a variety of factors, such as frequency of illumination source, size of touch screen, desired resolution of object location sensing, sensor packaging, image acquisition speed and cost.

In this embodiment, the image sensors 18 and 20 are wired together (or otherwise configured) in a way that they are triggered to capture an image simultaneously. For example, the two image sensors 18 and 20 may receive an image capture signal from a single digital output from a controller.

In the illustrated embodiment, first filter 22 and second filter 24 are used to control the frequency range of light that reaches the image sensors 18 and 20. As shown, the filters 22 and 24 of this embodiment are bandpass filters external to the image sensor 18 and 20. These filters 22 and 24 band pass the light entering the image sensors 18 and 20 such that one image sensor 18 can sense the light of the illumination source frequency and the other image sensor 20 cannot sense the light of the illumination source frequency but can see light frequencies near the frequency of the illumination source 12. In the illustrated embodiment, the first filter 22 is a band pass filter with an 850 nm center frequency and a 10 nm bandwidth, which passes light between 845 nm and 855 nm. One of the primary reasons for using the first filter 22 is to block out visible light reflected from the visible image projection (not shown) reflected off the screen 14.

The second filter 24 is selected to prevent a significant amount of the frequencies emitted by the illumination source 12 from reaching the second image sensor 20. In this embodiment, the second filter 24 is a bandpass filter with an 810 nm center frequency and a 10 nm bandwidth. It is not critical that the second sensor's filter 24 not include light from the broader range of the first filter 22. These two filters 22 and 24 may overlap as the gain calibration (discussed below) will adjust for the extra light being passed through the first sensor's filter 22. In this embodiment, the second filter 24 does block light from the illumination source 12 so that desired reflections from the illumination source 12 are not present in the image captured by the image sensor 20, and are therefore not subtracted out. More specifically, when the two images are subtracted, the ambient light is present in both and is subtracted out. However, the reflected light from objects touching screen 14 is only present in the image captured by image sensor 18 and not in the image captured by image sensor 20, thus only the reflected light from the objects touching screen 14 is present in the final image, while ambient light is substantially removed.

Figure 5:
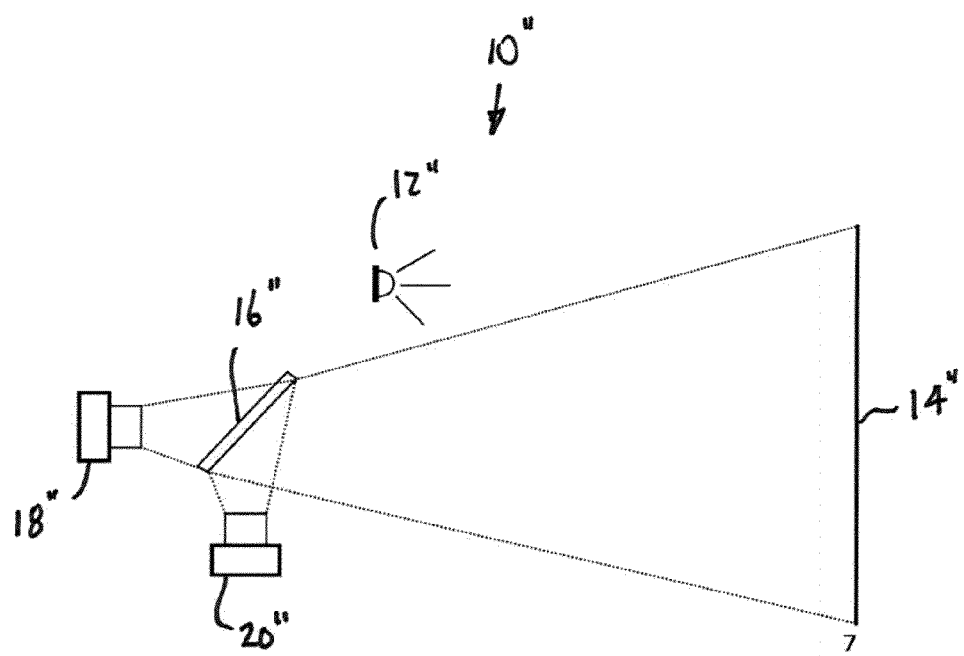
FIG. 5 is a schematic representation of a multitouch system in accordance with a second alternative embodiment of the present invention.

Although the filters 22 and 24 of this embodiment are external filters, the filters need not be external. For example, the filters may be internal to the image sensors 18 and 20 or partially or wholly implemented in the beam splitter 16. An alternative embodiment of the present invention in show in FIG. 5. In this embodiment, the system 10" includes filters that are integrated into the image sensors and/or the beam splitter. As shown, the system 10" includes an illumination source 12", a screen 14", a beam splitter 16", a first image sensor 18" with integrated filter and a second image sensor 20" with an integrated filter. In use, this system 10" operates in essentially the same manner as system 10, except that the filters are not separate from image sensors.

In addition to the components discussed above, the system 10 of the illustrated embodiment includes hardware and software for (a) generating and projecting the visible light images on the screen 14, (b) capturing images from the images sensors 18 and 20, (c) processing the images, (d) detecting touches through analysis of the processed images, (e) tracking touches (including moving touches) through analysis of the processed images and (f) reporting touches. Systems and methods for generating visible light images on the screen 14 are well known and will not be described in detail. Suffice it to say that a controller may be provided for generating the desired images, such as menus, prompts and other graphics that might be useful in guiding the user interface. These menus, prompts and other graphics may be projected onto the screen 14 using conventional visible light projects, including without limitation front or rear projectors.

Figure 6:
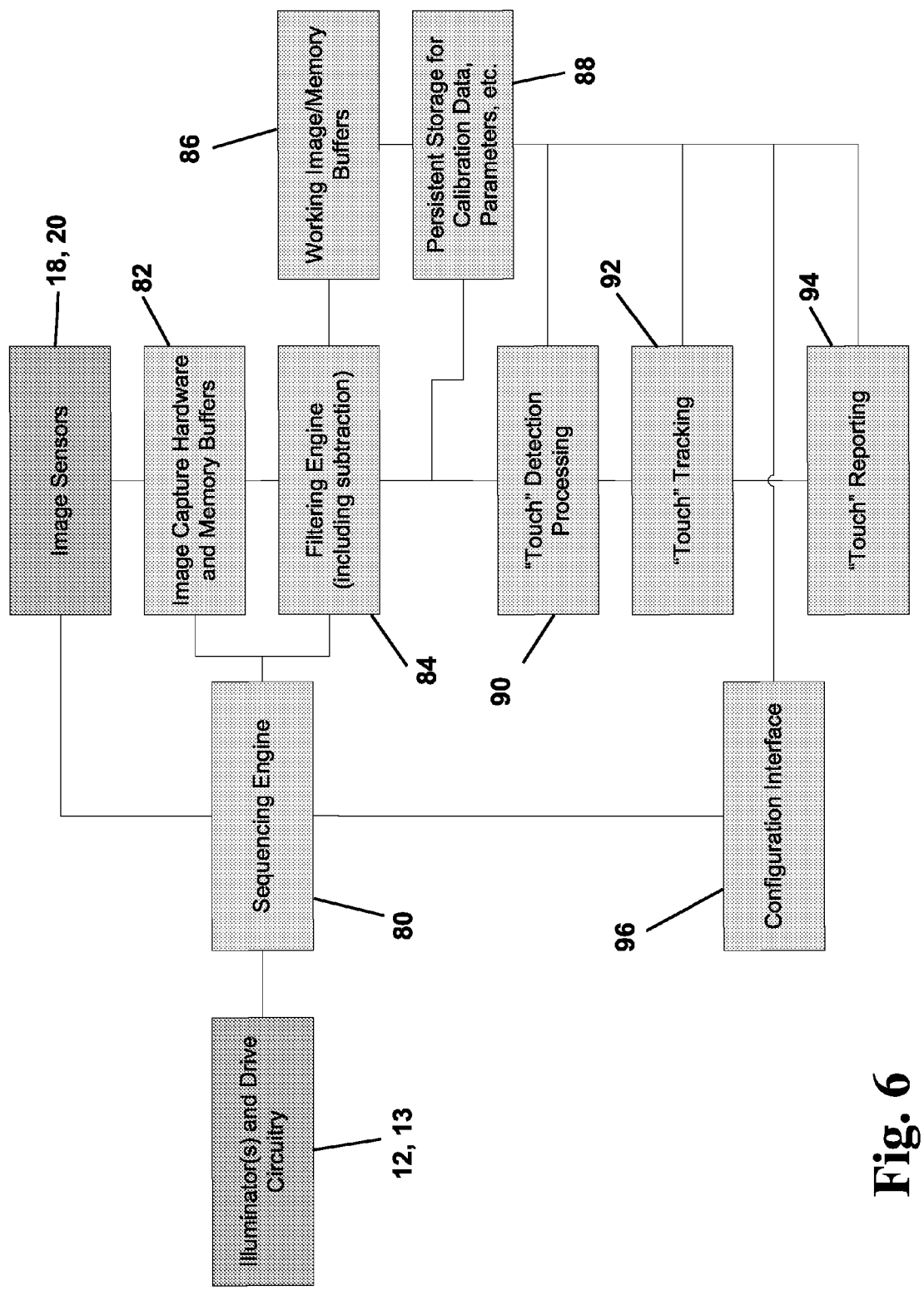
FIG. 6 is a block diagram of the hardware and software components of one embodiment of the present invention.

The system 10 may include one or more controllers, processors or digital logic (e.g. an FPGA) that are programmed or configured to control the capture of images, the processing of images, the detection of touches, the tracking of touches and the reporting of touch screen activity. FIG. 6 is a representation of the hardware and software layout of one embodiment of the present invention. In this embodiment, the system 10 hardware includes illuminators 12 and drive circuitry 13, as well as image sensors 18 and 20. The system 10 may include a single controller (not specifically shown) having a sequencing engine 80 that controls illumination of the illumination source 12, triggers simultaneous image capturing from the two image sensors 18 and 20 and directs operation of a filtering engine (discussed below). The captured images may be captured and stored using any suitable hardware, such as image capture hardware and memory buffers 82 represented in FIG. 6. The controller may also include a filtering engine 84 that is capable of digitally manipulating the captured images. For example, the filtering engine 84 may be capable of filtering, subtracting and otherwise modifying the captured images. The filtering engine 84 may be operatively coupled to appropriate memory, such as working image/memory buffers 86 represented in FIG. 6. The system 10 may also include persistent storage 88 for various items, such as calibration data and operating parameters. The controller may also include a "touch" detection processing section 90 for analyzing processed images to identify touches and a "touch" tracking section 92 for analyzing the processed images to track movement of "touches" across the screen 14. Further, the controller may include "touch" reporting section 94 for reporting touch screen activity as appropriate. For example, the system 10 may include means for reporting data representative of touch screen activity to the underlying system for processing. The system 10 may also include a configuration interface 96 that, among other things, drives system setup, including any desired calibration processes. Generally speaking, the configuration interface 96 may be used to provide a way to interact with the software that runs the system to make it easier to optimize the operation of the system. For example, the configuration interface 96 may be used in connection with coordinate alignment, screen calibration (i.e. background image, dark image, illumination normalization, lens/beam splitter aberration correction, FOV alignment correction) and making adjustments to algorithm parameters.

III. Operation

As noted above, the present invention provides a method for addressing ambient light in a captured image. In one embodiment, the method includes the general steps of: (a) providing an illumination source that emits light in a frequency range to illuminate the field of view of the image sensors; (b) providing two image sensors arranged to have the same field of view; (c) providing the first sensor with a filter to pass light from at least a portion of the frequency range of the illumination source, (d) providing the second sensor with a filter to pass light of a frequency band that is near, but does not include the frequency range of the illumination source; (e) simultaneously capturing images with the first image sensor and the second image sensor; and (f) subtracting the image captured by the second sensor from the image captured by said first sensor resulting in a third image that only shows reflected light from the controlled light source with the ambient light largely eliminated.

Figure 7:
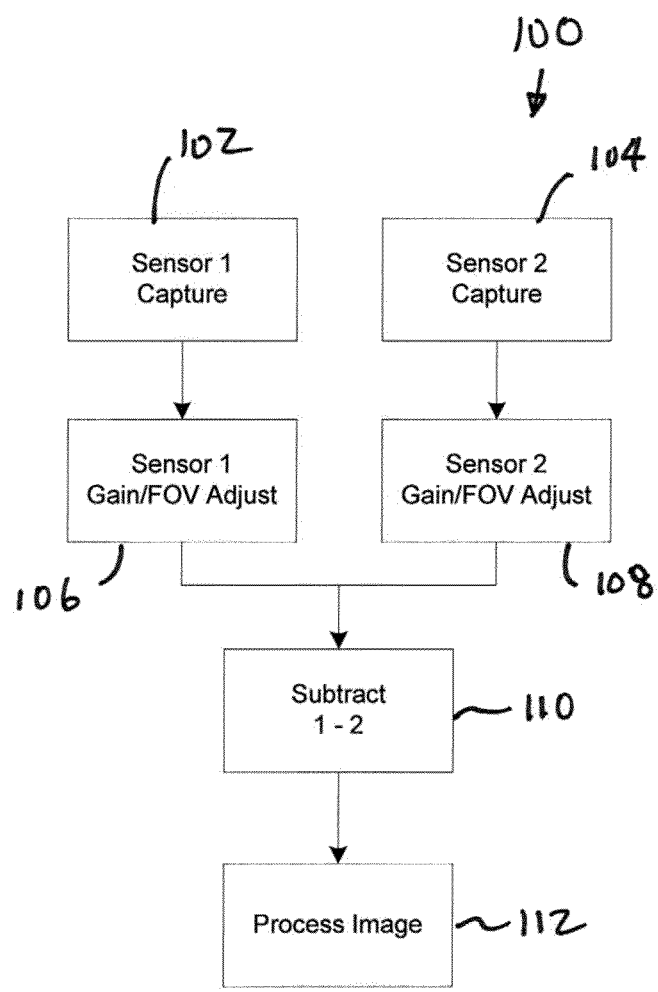
FIG. 7 is a flow chart showing the general steps of an embodiment of the present invention.

FIG. 7 is a process diagram showing the general steps associated with the multitouch input system embodiment of FIG. 1. As described in more detail below, the process 100 involves capturing two images simultaneously 102, 104, adjusting the two captured images 106, 108, subtracting the two adjusted images 110 and processing the image 112 resulting from the subtraction step to quantify screen activity (e.g. screen touches and on screen movement).

While any frequency band could theoretically be used for the illumination source, there are different factors to consider in what frequency band is used. The following is a nonexclusive list of factors that may be considered in selecting a frequency band:

i. Noise, The ideal illumination wavelength is one that has no, or few, natural or artificial competing sources. This would make it easier to detect touches without having to deal with noise.

ii. Safety, because the illumination sources are illuminating from behind the touch surface, and the touch surface should allow the illumination source to pass through it, the illumination source wavelength should be safe.

iii. Cost, using illumination wavelengths closer to the visible light spectrum generally results in more available and less costly cameras and filters.

iv. Interference with complementary devices, because this touch detection system works well in combination with projection displays, illumination wavelengths within (versus adjacent, as noted above) to the visible light range could cause interference with the projected image (for example, if the illumination wavelength was in the red spectrum, the projected display would always have a red tint to it because of the extra light emitted by the illumination sources) and the projected image could cause interference with the touch detection system.

As noted above, ambient light is removed by subtracting two simultaneously captured images. For this process to provide the best possible results, it is beneficial for the two captured images to correspond as closely as reasonable possible. For example, it is desirable for the two image sensors 18 and 20 to have the same FOV. In the illustrated embodiment, this is achieved by providing a beam splitter 16 that, as discussed above, splits light to provide both image sensors 18 and 20 with roughly the same FOV. Although a half-silvered mirror is used as a beam splitter 16 in the illustrated embodiment, the beam splitter may be any device or apparatus capable of provide the two image sensors with essentially the same FOV. The beam splitter 16 and/or the image sensors 18 and 20 may be positioned and oriented in a way that provides correlation between the captured images. It is possible that manufacturing tolerances will not constrain the beam splitter 16 and image sensors 18 and 20 sufficiently to produce identical FOVs. It may therefore be desirable to use image sensors that have the ability to use a smaller subset of the total image field and thus identical FOVs could be achieved through software configuration of the cameras. Alternately, the mechanical design could allow for manual fine tuning of the FOVs. For example, the beam splitter 16 and/or image sensors 18 and 20 may be adjustably mounted so that their position and/or orientation may be adjusted to provide improved correlation between the captured images.

The image sensors 18 and 20 are filtered so that the captured images represent light for select frequency bands. Although the embodiment of FIG. 1 includes separate light filters 22 and 24 positioned between the beam splitter 16 and the image sensors 18 and 20, the filters may be partially or fully incorporated into the beam splitter 16 and/or the image sensors 18 and 20. The present invention is not limited to physical light filters, but instead extends to essentially any components or methods for obtaining the desired frequency band functionality.

The goal in selecting the filter bands for the different image sensor is primarily to select an illumination frequency band using the above criteria, and selecting another frequency band that will be used as the noise (e.g. ambient light) frequency band:

i. The noise frequency band should be selected so that the amount of ambient light noise levels in the illumination and noise wavelengths are approximately equivalent. The closer the noise levels in the two frequency bands are, the more accurately the system will operate. The largest delta or difference between these frequencies depends on the quality of ambient light suppression needed. One could examine the spectrum of anticipated ambient light sources (i.e. sunlight) and compare the intensities of the light at the intended frequencies to indicate how far apart the filter center frequencies could be. The noise and illumination frequency bands should be as similar as possible limited by the next item (selectivity of the band pass filters.)

ii. Cost and availability, if the selected frequency bands are too close together, effective filters may be more difficult to find since there will be more overlap between the two bands of light admitted by the filters.

In one embodiment, the first filter may pass a band of frequencies centered on 850 nm and the second filter may pass a band of frequencies centered on 810 nm. These frequencies are far enough apart, assuming a 10 nm filter bandwidth. In this embodiment, the illumination source 12 is selected to primarily emit light in the range of 845 nm to 855 nm, and only relatively insignificant amounts of light in the range of 805 nm to 815 nm. As such, the second filter shouldn't pass a significant amount of light at the illuminator frequency. Both bandpass filter frequencies are high enough that the filters can effectively remove visible light and are still low enough that commodity cameras can still sense the passed light frequency.

In some applications, it may be desirable to adjust one or both images to account for variations in the two image sensors 18 and 20. For example, when there are differences in the two image sensors it may be desirable to run one or both of the captured images through a gain adjustment. The gain adjustment will normalize the images so that the ambient light that appears in each image has the about the same intensity in each image. This normalization may be performed by hardware logic (or other apparatus) that multiplies each pixel of one or both images by a predetermined value selected to equalize the two images.

The gain adjustment values may be calculated during calibration of the system. The calibration process may include the general steps of:

i. Capture an image with no user contact on the screen and zero ambient light passing through the screen. The image from the first sensor 18 (with the first filter, i.e. 850 nm) will be the dark-image.

ii. A second set of images is taken with an ambient light source shining on the screen. The image from the first sensor 18 is image A, the image from the second sensor 20 is image B.

iii. The image B is then subtracted from image A in the processor to produce an image C. This resulting image, C, represents the differences between A and B that are to be accounted for.

iv. Depending on the magnitude of values in image C, the gain for A and/or B may need to be adjusted. If the numbers are relatively small, the darker image may be run through a gain and/or offset filter to bring them up to equal or increase them to a more useful value. If there is a large difference in brightness between the images, both images may need to be run through gain and/or offset filters to achieve a middle value, applying a positive gain on one image while applying a negative gain on the second image.

In some applications, the image sensors 18 and 20, beam splitter 16 and/or filters 22 and 24 may corrupt the captured images such that the pixel to pixel continuity (or alignment) is lost. In such applications, a transformation matrix or similar approach could be used to adjust either or both images to correct for such corruption. In the illustrated embodiment, these adjustments will be performed in software, for example, in a configuration program, but may alternatively be performed in digital logic (e.g. an FPGA). The configuration program will expect to see a test pattern on the screen, which it will use to set the desired adjustments for each image sensor 18 and 20. The captured images and a known pattern are compared and the window of valid data from each image is set along with the desired transformations to adjust for skewing, etc. When subsequent images are read from the sensors, they are run through these same transformations before being subtracted.

In some applications, the illumination source may provide uneven illumination of the target. The system may implement a technique for dealing with uneven illumination of the target. An image is taken with a representative target in front of the display (collected when the device was initially calibrated/built). The representative target may be selected as an optimally reflective target that accurately duplicates the reflective properties of the typical material used to interact with the system. A matrix is constructed to normalize the image to a consistent level. The normalization matrix is used to correct lit images before they are subtracted. In applications where it is anticipated that users will interact with the system using materials that have a range of reflective properties, multiple targets (where each target duplicates the reflective properties of one of the expected materials) could be used to build up one or more normalization matrices that represent specific materials or averages of multiple materials.

In the multitouch application of the illustrated embodiment, the resulting subtracted images are further filtered (blurred/smoothed) and not examined for single pixel features but rather for regions of pixels. This relaxes the requirement for precise/absolute pixel to pixel matching between the image sensors. The subtraction of images may be more than just a simple subtraction. Depending on the techniques used to analyze the resulting image, a filter (digital or analog, including a combination of multiple discrete filters) could be used on either or both of the images before the subtraction is done. The subtraction filters would likely be used to slightly blur the images so precise pixel to pixel alignment between the sensors FOV would not be required. These digital filters would be constructed using combinations of standard filter techniques.

The two adjusted images are then subtracted from one another to produce a third image that represents an image of the target illuminated only by the illuminators with the ambient light eliminated. This third image is then passed off to be processed by the machine as needed. In this illustrated multitouch application, the image is passed off to a processor or digital logic (e.g. an FPGA) for filtering and analysis using blob detection and blob tracking algorithms that quantify screen activity. The output of the processing steps may be reported as desired.

As noted elsewhere, it may be desirable to apply different types of filtering to the captured images. Some of these filters may relate to calibration and compensation for practical limitations in hardware. Other filters may be applied to improve processing and interpretation of screen activity. In any event, each of these filters is generally optional and the present invention should not be limited to applications that utilize one or more of these filters or filtering techniques. With that said, the specific steps for filtering and adjusting each captured image in one embodiment of the present invention are as follows:

i. A background image (collected/defined when the device was initially calibrated/built) is subtracted from the captured image to remove areas of non-interest (often the region around the outside edges of the display area). Note that the display area need not be flat and that it may be any shape and may be multiple smaller areas of irregular shape.

ii. The subtracted image is normalized (if a normalization matrix is available).

iii. The image result of step ii is low pass filtered, for example, to "smooth" the image.

iv. The image result of step ii is high pass filtered, for example, to "sharpen" the image.

v. The image result from step iv is subtracted from the image result from step iii. This step diminishes large areas of consistent intensities.

vi. The result from step v is amplified.

vii. The result from step vi is thresholded and this image is used for blob detection.

There are a variety of known methods for thresholding an image, and the process may vary from application to application. However, in the illustrated embodiment, the thresholding process may involve setting all pixels in the image below a certain value to 0 and the other pixels to 1. The thresholding process will vary depending on a variety of factors, such as the type of image sensor and the format in which image data is stored. In one embodiment, the image sensor is a camera that gives "color" image data in a 2D array (e.g. 320 pixels wide by 240 pixels tall) in YCC format (16 bit per pixel from a Bayer pattern sensor). The color data may be converted to grayscale (8 bits per pixel). The grayscale image may be fed through the filter steps discussed above up through and including step vi (amplification) and finally the image may be reduced to 1 bit per pixel in step vii using a threshold. The threshold value may be ~3 out of a 0 to 255 (8 bit) range.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the invention or the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth. Any reference to claim elements in the singular, for example, using the articles "a," "an," "the" or "said," is not to be construed as limiting the element to the singular.

The embodiments of the invention in which an exclusive property or privilege is claimed are defined as follows:

1. A machine vision system comprising:
   a plurality of image sensors, including at least a first image sensor and a second image sensor, said first image sensor configured to obtain a first image from a field of view; said second image sensor configured to obtain a second image from said field of view; and
   a controller configured to:
      cause said plurality of image sensors to substantially simultaneously capture at least said first image and said second image; and
      produce a third image of said field of view adjusted for ambient light as a function of at least said first image and said second image; and
   a first illumination source and a second illumination source;
   wherein said controller is configured to selectively cause:
      said first image sensor and said second image sensor to substantially simultaneously capture said first image and said second image when illuminated by said first illumination source;
      said first image sensor and said second image sensor to substantially simultaneously capture a fourth image and a fifth image when illuminated by said second illumination source;
      stitching together said first image and said fourth image to produce a sixth image;
      stitching together said second image and said fifth image to produce a seventh image; and
      produce said third image of said field of view that is adjusted for ambient light as a function of said sixth image and said seventh image.

2. The system of claim 1 wherein said first image sensor is configured to obtain an image from a frequency range including light from said source of illumination, said second image sensor configured to obtain an image from a frequency range not including a substantial amount of light from said source of illumination.

3. The system of claim 2 further including a beam splitter, said beam splitter configured to split light to simultaneously send said field of view to said first image sensor and said second image sensor.

4. The system of claim 3 wherein said beam splitter is a half-silvered minor.

5. The system of claim 2 wherein said first image sensor includes a filter that permits passage of light in a frequency range including light from said first source of illumination, said second image sensor includes a filter that substantially attenuates light from said first source of illumination.

6. The system of claim 2 wherein said first illumination source is an infrared light emitting diode.

7. The system of claim 6 wherein said illumination source has a half power range of 842 nm to 864 nm, said first image sensor includes a filter passing light in a range of 845 nm to 855 nm, said second image sensor includes a filter passing light in a range of 805 nm to 815 nm.

8. A method for adjusting ambient light conditions in an image, comprising the steps of:
   illuminating an object with a first source of light in a first frequency range, wherein the object is a screen, the screen being at least partially transparent to light in the first frequency range and to ambient light;
   providing a first image sensor with a filter allowing light from at least a portion of the first frequency range to pass;
   providing a second image sensor with a filter that does not allow a substantial amount of light from the first frequency range to pass;
   splitting light from the object to substantially simultaneously project two substantially identical images onto the first image sensor and the second image sensor, wherein said splitting step includes passing light from the screen through a beam splitter, the beam splitter configured to pass substantially identical images to the first image sensor and the second image sensor;
   substantially simultaneously obtaining a first image of the object with the first image sensor and a second image of the object with the second image sensor, and
subtracting the first image and the second image to obtain a third image with reduced ambient light; and
further including the step of transforming at least one of the first image and the second image to provide substantial correlation between the first image and the second image before said subtracting step.

9. A method for adjusting ambient light conditions in an image, comprising the steps of:
   illuminating an object with a first source of light in a first frequency range, wherein the object is a screen, the screen being at least partially transparent to light in the first frequency range and to ambient light;
   providing a first image sensor with a filter allowing light from at least a portion of the first frequency range to pass;
   providing a second image sensor with a filter that does not allow a substantial amount of light from the first frequency range to pass;
   splitting light from the object to substantially simultaneously project two substantially identical images onto the first image sensor and the second image sensor, wherein said splitting step includes passing light from the screen through a beam splitter, the beam splitter configured to pass substantially identical images to the first image sensor and the second image sensor;
   substantially simultaneously obtaining a first image of the object with the first image sensor and a second image of the object with the second image sensor, and
subtracting the first image and the second image to obtain a third image with reduced ambient light; and
further including the step of normalizing at least one of the first image and the second image before said subtracting step.

* * * * *

UNITED STATES PATENT AND TRADEMARK OFFICE
CERTIFICATE OF CORRECTION

| | | |
|---|---|---|
| PATENT NO. | : 8,836,672 B2 | Page 1 of 1 |
| APPLICATION NO. | : 13/368381 | |
| DATED | : September 16, 2014 | |
| INVENTOR(S) | : Curtis W. Stienstra et al. | |

It is certified that error appears in the above-identified patent and that said Letters Patent is hereby corrected as shown below:

IN THE CLAIMS:

Column 13, Claim 4, Line 59:
"minor" should be --mirror--

Signed and Sealed this
Thirteenth Day of January, 2015

Michelle K. Lee
*Deputy Director of the United States Patent and Trademark Office*